(12) United States Patent
Fischer et al.

(10) Patent No.: US 6,799,158 B2
(45) Date of Patent: Sep. 28, 2004

(54) METHOD AND SYSTEM FOR GENERATING A CHARACTERISTIC IDENTIFIER FOR DIGITAL DATA AND FOR DETECTING IDENTICAL DIGITAL DATA

(75) Inventors: Uwe Fischer, Boeblingen (DE); Stefan Hoffmann, Weil im Schoenbuch (DE); Werner Kriechbaum, Ammerbuch-Breitenholz (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 09/739,130

(22) Filed: Dec. 18, 2000

(65) Prior Publication Data

US 2001/0005823 A1 Jun. 28, 2001

(30) Foreign Application Priority Data

Dec. 24, 1999 (DE) .......................................... 99125884

(51) Int. Cl.$^7$ .......................... G10L 19/14; G10L 15/08
(52) U.S. Cl. ...................................... 704/205; 704/245
(58) Field of Search ...................... 379/88.25; 382/159; 455/3.06; 700/94; 702/30; 704/203, 205, 209, 214, 216, 220, 231, 236, 245, 259, 262; 725/22; 84/609, 616

(56) References Cited

U.S. PATENT DOCUMENTS 4,783,754 A * 11/1988 Bauck et al. ................ 704/203
5,918,223 A * 6/1999 Blum et al. ..................... 707/1

OTHER PUBLICATIONS

Foote, Jonathan, "An Overview of Audio Information Retrieval," Dec. 18, 1997, jtfoote@bigfoot.com, pp. 1–18.*
Foote, J. T., "Content–Based Retrieval of Music and Audio," in Kuo et al., editor, Multimedia Storage and Archiving Systems II, Proc. of SPIE, vol. 3229, pp. 138–147, 1997.*
Tzanetakis, et al. "A framework for audio analysis based on classification and temporal segmentation," Sep. 8–10, 1999, in Proc. Euromicro, Workshop on Music Technology and Audio processing, Milan, Italy.*
Welsh, et al. "Querying Large Collections of Music for Similarity," Nov. 1999, UC Berkely Technical Report UCB/CSD–00–1096.*
Wold et al., Content–Based Classification, Search, and Retrieval of Audio, IEEE Multimedia, vol. 3, Issue 3, Fall 1996, pp. 27–36.*

* cited by examiner

Primary Examiner—Richemond Dorvil
Assistant Examiner—V. Paul Harper
(74) Attorney, Agent, or Firm—Louis J. Percello, Esq.

(57) ABSTRACT

A characteristic identifier for digital data is generated. Thereby, the information contained in a digital data set is reduced such that the resulting identifier is made comparable to another identifier made in the same manner. The generated identifiers are used for detecting identical digital data or to determine inexact copies of digital data. In one embodiment of the invention, the digital data is a digital audio signal and the characteristic identifier is called an audio signature. The comparison of identical audio data according to the invention can be carried out without a person actually listening to the audio data. The present invention can be used to establish automated processes to find potential unauthorized copies of audio data, e.g., music recordings, and therefore enables a better enforcement of copyrights in the audio industry.

24 Claims, 11 Drawing Sheets

METHOD AND SYSTEM FOR GENERATING A CHARACTERISTIC IDENTIFIER FOR DIGITAL DATA AND FOR DETECTING IDENTICAL DIGITAL DATA

FIELD OF THE INVENTION

The invention relates generally to digital data. More particularly, the invention relates to a method and system for generating a characteristic identifier for digital data and for detection of identical digital data.

BACKGROUND OF THE INVENTION

In recent years, an increasing amount of audio data is recorded, processed, distributed, and archived on digital media using numerous encoding and compression formats, such as WAVE, AIFF (Audio Interchange File Format), MPEG (Motion Picture Experts Group), and REALAUDIO. Transcoding or resampling techniques that are used to switch from one encoding format to another almost never produce a recording that is identical to a direct recording in the target format. A similar effect occurs with most compression schemes. Changes in the compression factor or other parameters result in a new encoding and a bit stream that bears little similarity to the original bit stream. Both effects make it rather difficult to establish the identity of one audio recording stored in two different formats. Establishing the possible identity of different audio recordings is a pressing need in audio production, archiving, and copyright protection.

During the production of a digital audio recording, usually numerous different versions in various encoding formats come into existence as intermediate steps. These different versions are distributed over a variety of different computer systems. In most cases, these recordings are not cross-referenced and often it has to be established by listening to the recordings whether two versions are identical or not. An automatic procedure will greatly ease this task.

A similar problem exists in audio archives that have to deal with material that has been issued in a variety of compilations (such as Jazz or popular songs) or on a variety of carriers (such as the famous recordings of Toscanini with the NBC Symphony orchestra). Often the archive version of the original master of such a recording is not documented and in most cases it can only be decided by listening to the audio recordings whether a track from a compilation is identical to a recording of the same piece on another sound carrier.

Copyright protection is a key issue for the audio industry. Copyright protection is even more relevant with the invention of new technology that makes creation and distribution of copies of audio recordings a simple task. While mechanisms to avoid unauthorized copies solve one side of the problem, it is also required to establish processes to detect unauthorized copies.

SUMMARY OF THE INVENTION

According to one aspect of the present invention, a characteristic identifier for digital data is generated. The information contained in the data is thereby reduced such that the resulting identifier is made comparable to another identifier. Identifiers generated according to the present invention are resistant against artifacts that are introduced into digital data by all common compression techniques. Using such identifiers therefore allows the identification of identical digital data independent of the chosen representation and compression methods.

Furthermore, the generated identifiers are used for detecting identical digital data. It is decided whether sets of digital data are identical depending on the distance between the identifiers belonging to them. A faster, cheaper and more reliable process of detection of identical digital data is established.

In a preferred embodiment of the present invention, the digital data is a digital audio signal and the characteristic identifier is called an audio signature. The comparison of identical audio data according to the invention can be carried out without a person actually listening to the audio data.

The present invention can be used to establish automated processes to find potential unauthorized copies of audio data, e.g., music recordings, and therefore enables a better enforcement of copyrights in the audio industry.

A more complete understanding of the present invention, as well as further features and advantages of the present invention, will be obtained by reference to the following detailed description and drawings

DETAILED DESCRIPTION OF THE INVENTION

Figure 1:
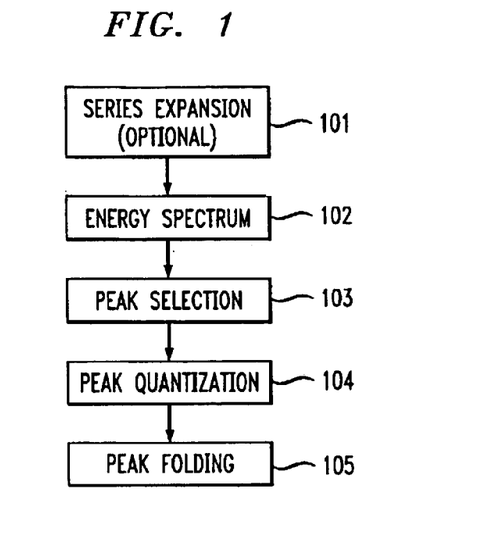
FIG. 1 is a flow diagram describing the generation of an audio signature according to an embodiment of the present invention.
Figure 14:
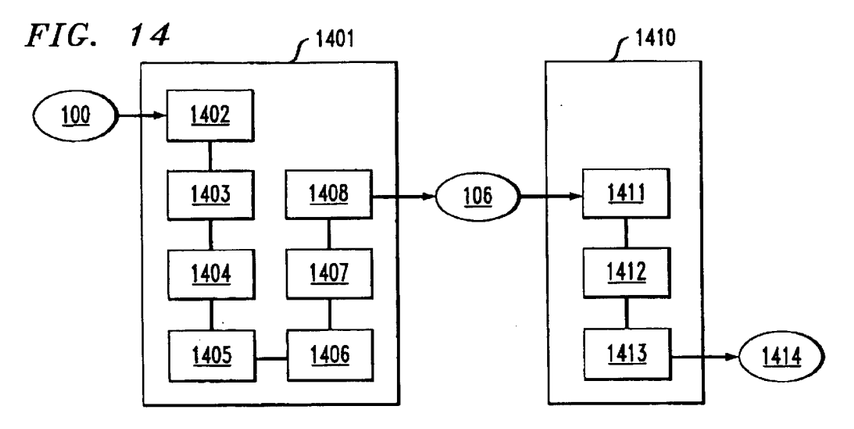
FIG. 14 shows a signature generator and a signature analyzer according to an embodiment of the present invention.

In FIG. 1, a flow diagram describing the method of generation of an audio signature according to an embodiment of the present invention is shown. In a preferred embodiment of the present invention, the procedure of generating an audio signature according to the present invention (steps 101 to 105 in FIG. 1) is carried out in a signature generator 1401 as illustrated in FIG. 14. Referring to FIGS. 1 and 14, a single channel digital audio signal 100 in WAVE data format may be used as an input to the signature generator 1401 and the method of FIG. 1. The terms 'monophonic' audio or 'mono' audio are used to describe such single channel audio data. If the audio signal 100 is available in another input format, it should be converted into the mono WAVE format prior to step 101. However, the present invention can be adapted for any arbitrary input format, e.g., mono AIFF (Audio Interchange File Format).

Operating on monophonic files is no restriction but is a matter of convenience. For multi-track recordings, like stereophonic or multi-track studio masters, the described method can easily be used to compute an audio signature for each individual channel. If an audio signature for the multi-track recording is needed or desired, the audio signatures for individual channels are preferably combined into a signature vector wherein each element i of the vector corresponds to the signature of track i.

In a preferred embodiment, the signature generator 1401, as illustrated in FIG. 14, comprises an input module 1402, through which the audio signals 100 are fed into or retrieved by the signature generator 1401. In a preferred embodiment, analog audio material is digitized prior to step 101 of FIG. 1 by appropriate means.

In a preferred embodiment, the signature generator 1401, as illustrated in FIG. 14, further comprises a series expansion module 1403, wherein the series expansion of the audio signal 100 (step 101) is carried out. In step 101, the coefficients $a_i$ of the series expansion of the audio signal 100 are calculated with respect to a complete set of elementary signals $\{\phi_i\}$. Thereby the following formula is used, wherein the audio signal 100 is denominated x, and the index i denominates the number of elementary signals $\phi_i$.

$$x = \sum_i a_i \varphi_i$$

A set of elementary signals $\{\phi_i\}$ is complete, if all signals x can be written as a linear combination of the elementary signals $\phi_i$.

If a set of elementary signals $\{\phi_i\}$ is complete, there exists a dual set $\{\phi'_i\}$ such that the coefficients $a_i$ can be computed as the inner product of the signal x with the dual set $\{\phi'_i\}$:

$$a_i = \sum_n \varphi'_i \in [n]x[n]$$

wherein the index i identifies the elementary signal $\phi_i$ and the index n runs through all data points of the audio signal x.

In cases where the elementary signals $\phi_i$ are localized in time (e.g., whenever the signal x is segmented into smaller blocks for processing or the elementary signals $\phi_i$ are only defined for a finite time interval), a local series expansion is computed for each block of data or each support interval of the elementary signals $\phi_i$. These local series expansions are accumulated in a vector A of series expansions where each element of A comprises the coefficients $a_i$ of the series expansion for a single window.

Those skilled in the art will not fail to realize that a great variety of sets of complete elementary signals exist that can be used to calculate a series expansion. These include, but are by no means restricted to, the sets of elementary signals used in Fourier, wavelet, or bilinear transformations.

Figure 2:
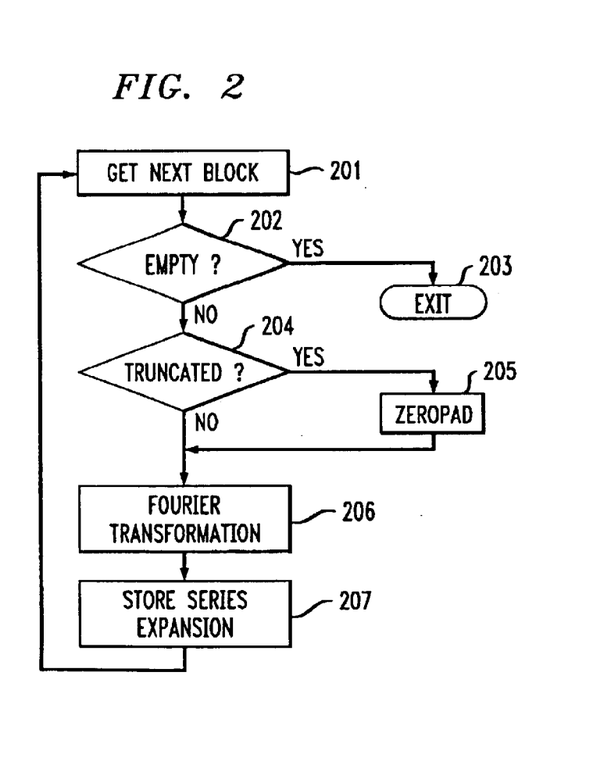
FIG. 2 is a flow diagram describing a series expansion according to an embodiment of the present invention.

In the preferred embodiment of the present invention, the monophonic input audio signal 100 is segmented into blocks of preferably one second duration, and, for each block, a discrete Fourier transformation is computed (step 101 in FIG. 1). FIG. 2 illustrates this process according to an embodiment of the present invention. Each block of the audio signal 100 is retrieved in step 201 and it is checked whether all audio data is processed (e.g., whether the block includes audio data or not) in step 202. If all audio data is processed the process exits in step 203 (and continues with step 102 in FIG. 1). Otherwise, the process continues with step 204, wherein it is checked whether or not the block is completely filled with audio data. If the block is a truncated block, the empty space is filled with the data content '0' in step 205 and the process continues with step 206. If the block is not truncated, a Fourier transformation is carried out in step 206. The resulting coefficients $a_i$ of the series expansion are assembled into the vector A and stored into a memory and/or directly forwarded in step 207 for use in step 102, as described below. The process returns to step 201 where the next block of the audio signal 100 is retrieved.

The discrete Fourier transformation, as carried out in step 20,6 can be interpreted as a series expansion of the audio signal 100 with respect to the set of elementary signals $\{\phi_i\}$:

$$\{\phi_i\} = \exp(-2i\pi k n / N)$$

For a signal with N data points the coefficients $a_i$ of the series expansion can be computed as:

$$a_k = \sum_{n=0}^{N-1} x[n]\exp(2i\pi k n / N)$$

wherein the index n runs through all data points and the index k identifies the elementary signal $\phi_i$.

In a preferred embodiment, the signature generator 1401 as illustrated in FIG. 14 further comprises a spectrum module 1404, wherein the calculation of a spectrum S is carried out (step 102 in FIG. 1).

Preferably, the energy spectrum S is calculated from the coefficients $a_i$ of the series expansion that result from step 101. The energy spectrum S is defined as:

$$S_i = |a_i|^2$$

In cases where the series expansion results in a vector A, a partial spectrum is computed for each element of this vector and the partial spectra are averaged to obtain the energy spectrum S.

In a preferred embodiment wherein a Fourier transformation is used to calculate the series expansion, the energy spectrum S generated in step 102 is usually known as power spectrum. In step 102, for each block of the audio input 100, the energy spectrum is calculated from the Fourier transformation and the spectra from all blocks are averaged.

Figure 3:
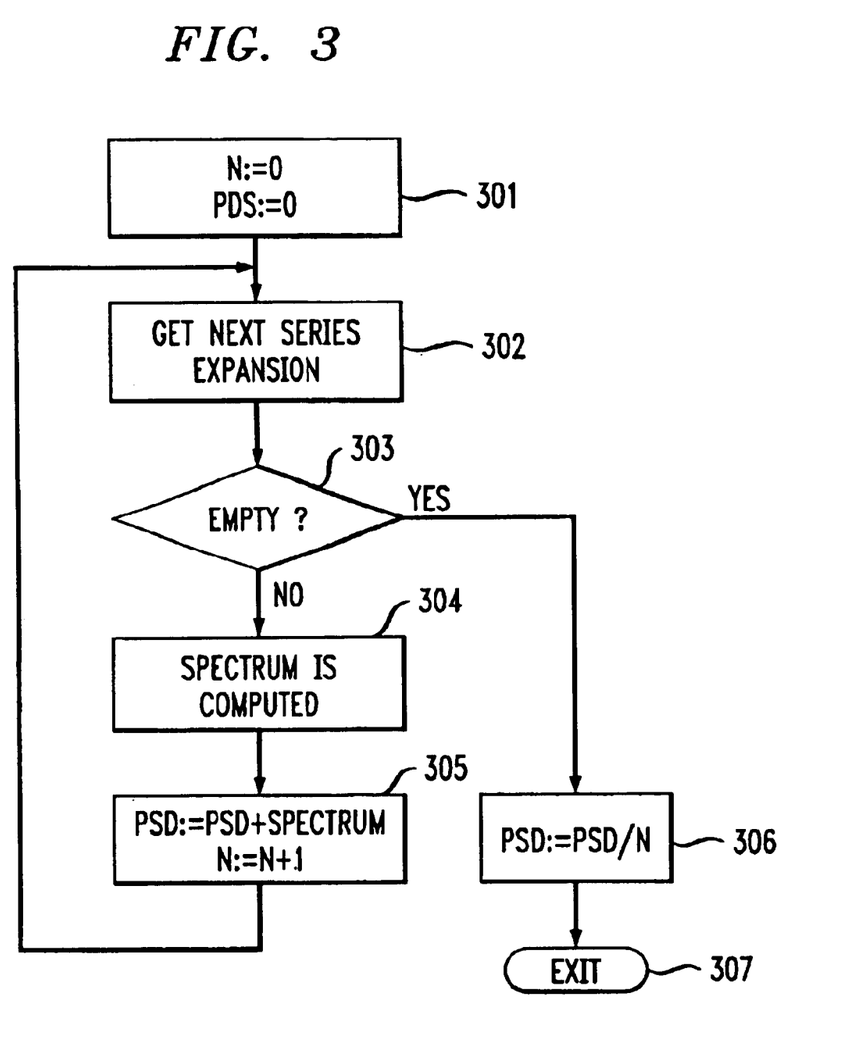
FIG. 3 is a flow diagram describing the generation of an energy spectrum according to an embodiment of the present invention.

FIG. 3 illustrates the process of step 102 according to an embodiment of the present invention. It is assumed that the results of step 101 have been previously stored (in step 207). In a first step 301 a counter n, a power spectral density vector (PSD) is created and initialized (=set to '0'). In step 302, the coefficients $a_i$ of the series expansion for a first block resulting from step 101 are retrieved. In step 103, it is checked whether the coefficients $a_i$ of all local series expansions have been processed. If they are not yet completely processed, the energy spectrum of that block is computed in step 304. This spectrum is added to the PSD vector and the counter n is incremented by a value of '1' in step 305. The process continues with returning to step 302, retrieving the coefficients $a_i$ of the series expansion of the next block. If all blocks have been processed, the process continues with step 306, subsequent to step 303. In step 306, the PSD vector (sum of all spectra) is divided by n to produce an average energy spectrum. The process of generating the energy spectrum exits with step 307, wherein the spectrum is stored and/or forwarded for use in the peak selection step 103 as described below.

Figure 4:
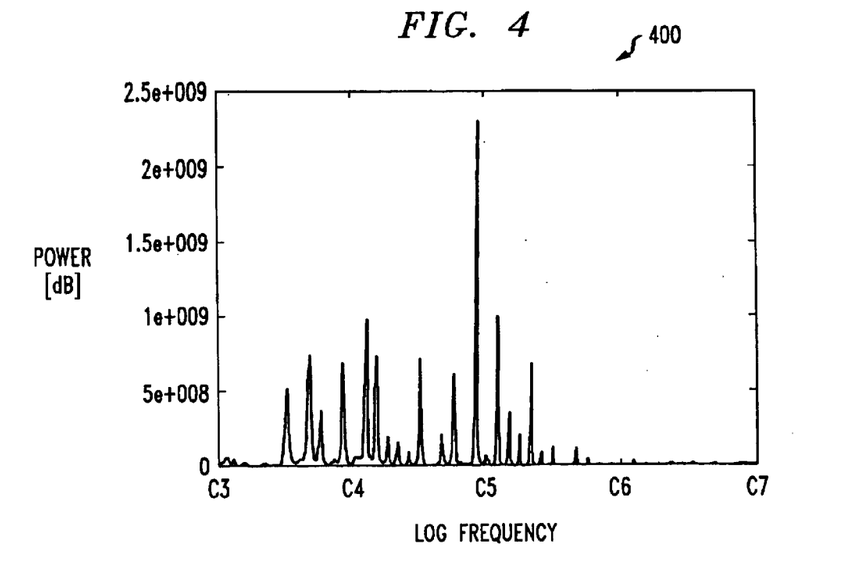
FIG. 4 shows an energy spectrum according to an embodiment of the present invention.

An example of a resulting energy spectrum 400 according to an embodiment of the present invention is shown in FIG. 4. The power of the audio signal 100 is plotted against a logarithmic frequency scale labeled using the standard musicological notation for frequencies with 'C4' corresponding to 261.63 Hz.

In a further embodiment of the present invention, the signature generator 1401 additionally comprises a format check module (not shown in FIG. 14), preferably connected between the input module 1402 and the series expansion module 1403. In the format check module, it is determined whether the audio signal 100 is already encoded as a series expansion. The format check module can be designed for carrying out any suitable method as known in the art, e.g., parsing of 'magic' strings in the header of the audio data 100. In most cases, where the audio signal 100 is already encoded as a usable series expansion, it is then preferably directly fed into or retrieved by the spectrum module 1404 without undergoing a series expansion. This could be performed by bypassing the series expansion module 1403.

In a further embodiment of the present invention, the energy spectrum is calculated whenever appropriate by other methods such as autoregressive spectral estimation, minimum variance spectral estimation, or Prony's method. Then the energy spectrum can be generated without carrying out a previous series expansion of the input data.

Figure 5:
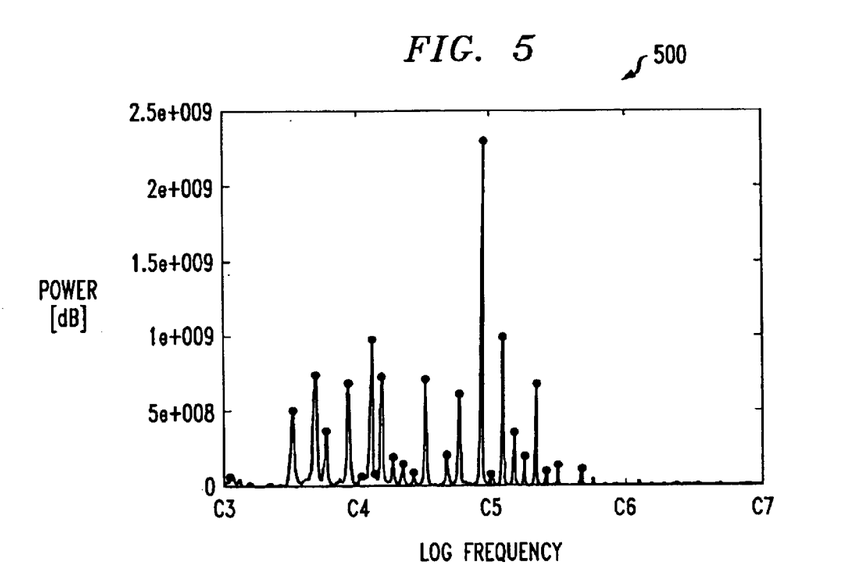
FIG. 5 shows an energy spectrum with selected peaks marked according to an embodiment of the present invention.

In a preferred embodiment, the signature generator 1401, as illustrated in FIG. 14, further comprises a peak selection module 1405, wherein the peak selection (step 103 in FIG. 1) is carried out. In step 103, the n most prominent local peaks are selected from the spectrum S as resulting from step 102. In a preferred embodiment of the present invention, the twenty-five most prominent local peaks are selected from the energy spectrum 400. FIG. 5 shows the marked energy spectrum 500 according to an embodiment of the present invention. The marked energy spectrum 500 corresponds to the energy spectrum 400 as shown in FIG. 4, with the twenty-five largest peaks marked with dots.

Figure 6:
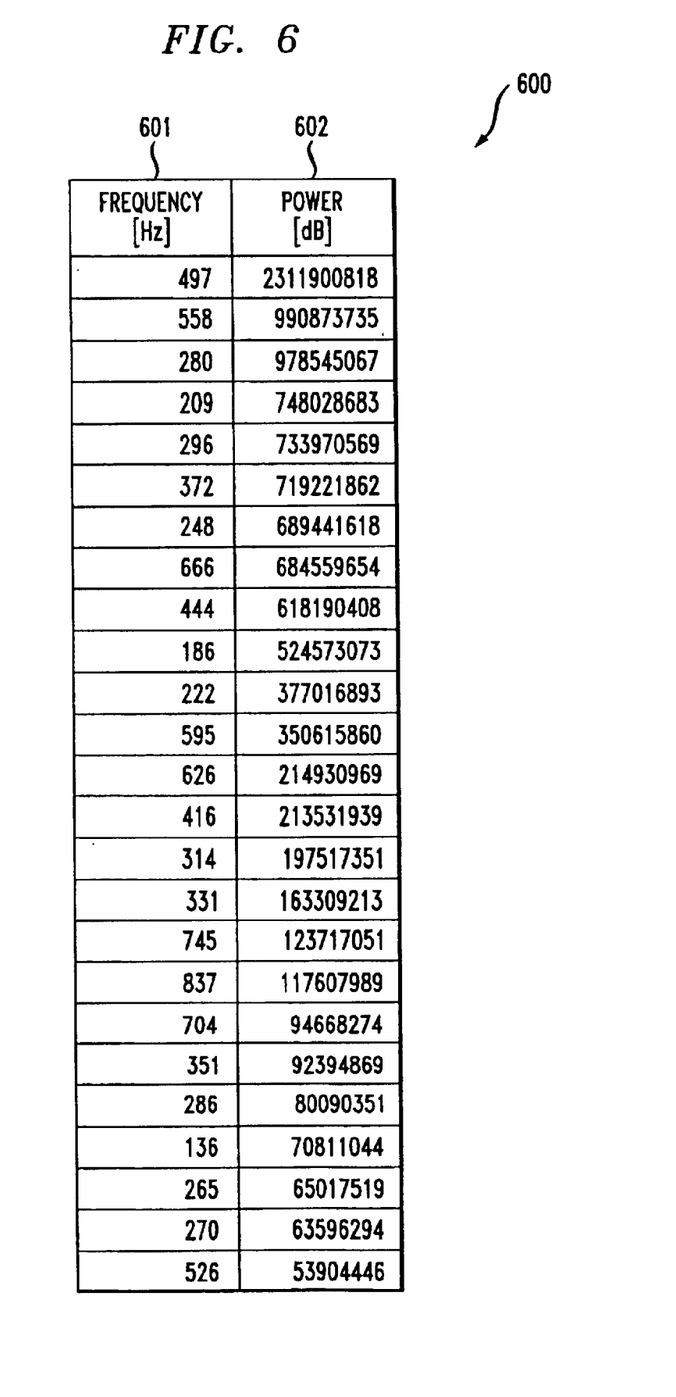
FIG. 6 shows a peak array according to an embodiment of the present invention.

Furthermore, a peak array is generated in step 103. Such a peak array (PA) 600 according to an embodiment of the present invention is shown in FIG. 6. The peak array 600 results from the marked energy spectrum 500 and contains the location frequency 601 of the n peaks in the first column and their magnitudes 602 in the second column. The peak array 600 is stored in a memory and/or forwarded directly to be used in peak quantization.

Figure 8:
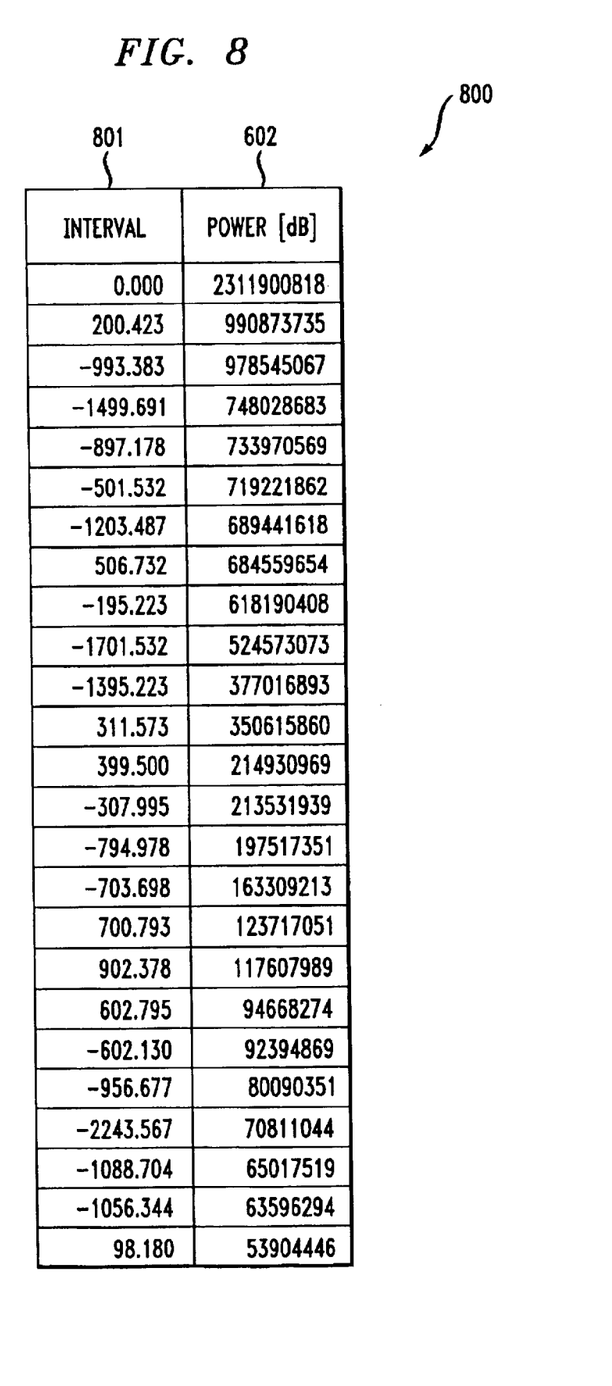
FIG. 8 shows an interval array according to an embodiment of the present invention.

In a preferred embodiment, the signature generator 1401, as illustrated in FIG. 14, further comprises a peak quantization module 1406, wherein the peak quantization (step 104 in FIG. 1) is carried out. In the first part of step 104, the frequency coordinates 601 of n peaks are transformed to an interval scale. FIG. 8 shows a resulting interval array 800 according to an embodiment of the present invention. The interval array 800 contains the interval scale 801 of the n peaks in the first column and their magnitudes 602 in the second column. Thereby the intervals are expressed in cents (an octave is divided into twelve-hundred cents). For carrying out the transformation, the following general formula may be used:

$$f' = a(\log_{base}(f) - \log_{base}(f_{max}))$$

In the above formula, $f'$ denominates the result of the transformation, whereas the frequencies are named $f$. Any logarithmic scale may be used. The multiplicand a is introduced to obtain results in an appropriate user friendly numeric range.

In a preferred embodiment, the frequency column 601 of the peak array 600 is transformed into a musicological interval scale 801 with the frequency of the strongest partial of the energy spectrum as zero point. The interval array computation according to an embodiment of the present invention is described in FIG. 7.

Figure 7:
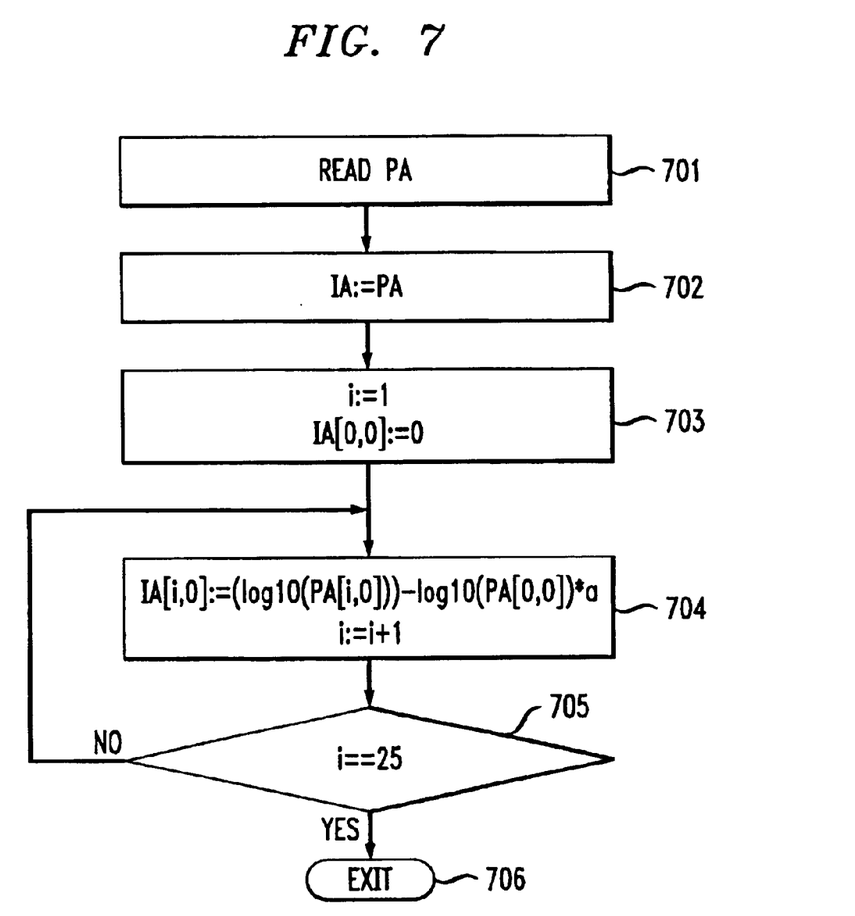
FIG. 7 shows a flow diagram describing the generation of an interval array according to an embodiment of the present invention.

In a first step 701, the peak array 600 is retrieved. In step 702, an interval array (IA) 800 is created, e.g., by duplicating the peak array 600. Next a counter i is set to the value '1' and the first frequency entry of the IA array 800 is set to '0' in step 703.

In step 704, the frequencies 601 are transformed to intervals 801 relative to the most prominent peak using the formula $$IA[i,0] = a(\log_{10}(PA[i,0]) - \log_{10}(PA[0,0]))$$

wherein the interval array IA and the peak array PA are indexed in the following way: the first index specifies the array's row (starting with row zero) and the second index specifies the array's column (starting with column zero).

The multiplicand a is the appropriate conversion factor to express the intervals in cents. Thereby, a is preferably set to 3986.31371392.

This process is repeated until the complete interval scale 801 has been computed, for which reason the counter i is incremented by the value of '1' in step 704. If the complete interval scale 801 has been computed (i=n), see step 705, the process of generating the interval scale exits with step 706. The resulting interval array 800 comprising the interval scale 801 is stored and/or forwarded directly to the quantization part of step 104 as described below.

In the second part of step 104, the values of the interval scale 801 are quantized by rounding them to the nearest value of an appropriate scale. For instance, for classical European music, a well-tempered scale is the most natural choice. Those skilled in the art will not fail to realize that, depending on the type and cultural background of the content to be described, a variety of different scale functions, including identity, may be used.

Figure 10:
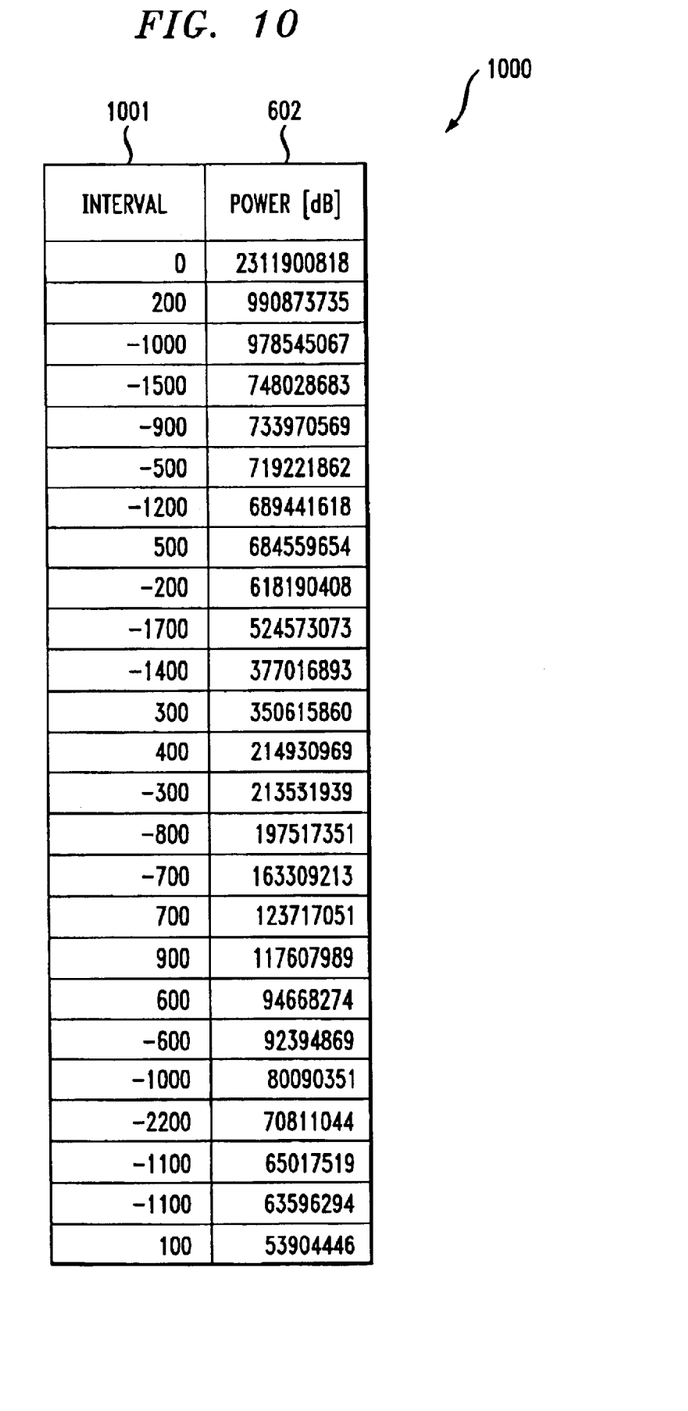
FIG. 10 shows a quantized interval array according to an embodiment of the present invention.

A quantized interval array according to an embodiment of the present invention and as derived from step 104 is shown in FIG. 10. The quantized interval array 1000 contains the quantized interval scale 1001 of the n peaks in the first column and their magnitudes 602 in the second column.

Figure 9:
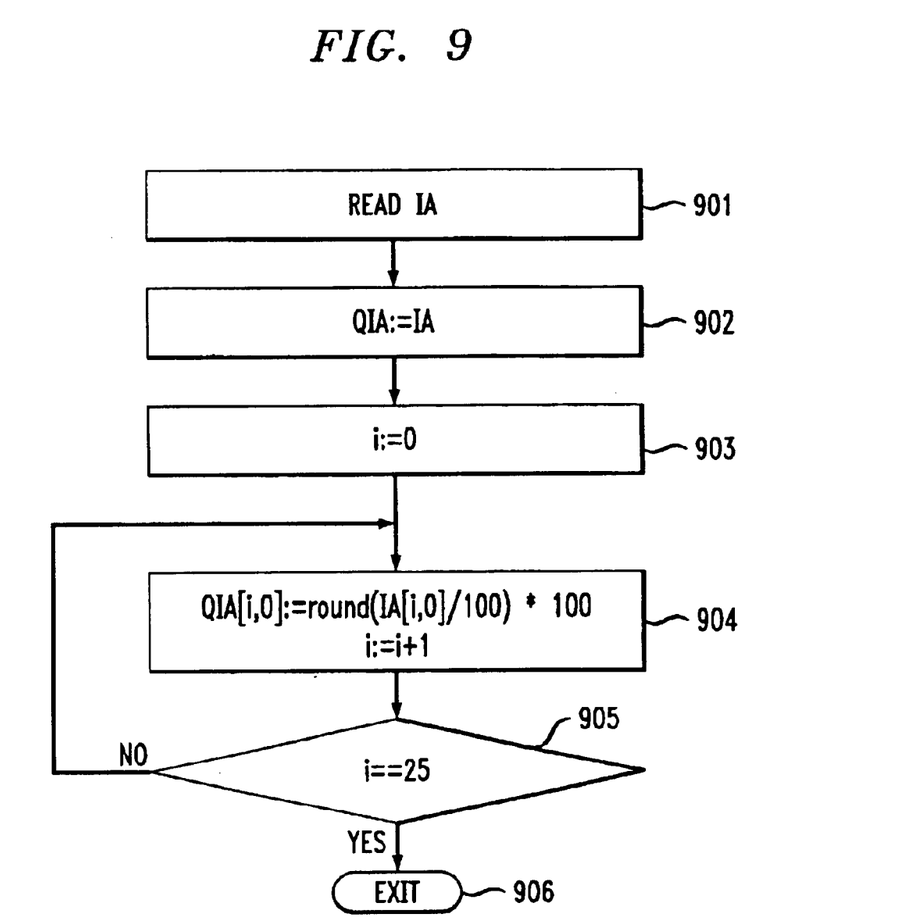
FIG. 9 is a flow diagram describing the computation of a quantized interval array according to an embodiment of the present invention.

The procedure of quantization according to an embodiment of the present invention is shown in FIG. 9. In a first step 901, the interval array 800 as generated during the first part of step 104 is retrieved. In the following step 902, a quantized interval array (QIA) is created, e.g. by duplicating the interval array 800. A counter i is initialized in step 903. In step 904, the quantized interval scale 1001 is calculated by $$QIA[i,0] = \text{round } (IA[i,0]/100)*100$$

wherein the quantized interval array QIA is indexed in the following way: the first index specifies the array's row (starting with row zero) and the second index specifies the array's column (starting with column zero). The counter i is incremented by the value of '1'.

This process is repeated until the complete quantized interval scale 1001 has been computed (i=n), see step 905, in which case the process of generating the quantized interval array exits with step 906. The quantized interval array is stored and/or forwarded for use in the peak folding step 105 as described below.

In a preferred embodiment, the signature generator 1401, as illustrated in FIG. 14, further comprises a peak folding module 1407, wherein the peak folding (step 105 in FIG. 1) is carried out. In step 105, an equivalence transformation is applied to the quantized interval scale 1001 of the peaks and the power values 602 for all equivalent frequency values are added at the location of the representative element creating cumulated power values. An example for such an equivalence relationship is the octave relationship (frequency doubling) between frequencies. It should be noted that amongst a variety of other equivalence relations, the identity relation which maps each frequency onto itself may be used as well. The resulting signature 106, which is used for unambiguously characterizing the input audio data 100, is the vector of cumulated power values for all representative elements sorted in an arbitrary, but fixed way, e.g. in increasing coordinates of the representative elements and normalized to a sum of '1'.

In the described embodiment, the power values 602 of all intervals that are an octave apart is added and the resulting cumulated power value is assigned to the smallest equivalent interval above the strongest partial of the energy spectrum (the zero point of the interval scale 1001).

Figure 11:
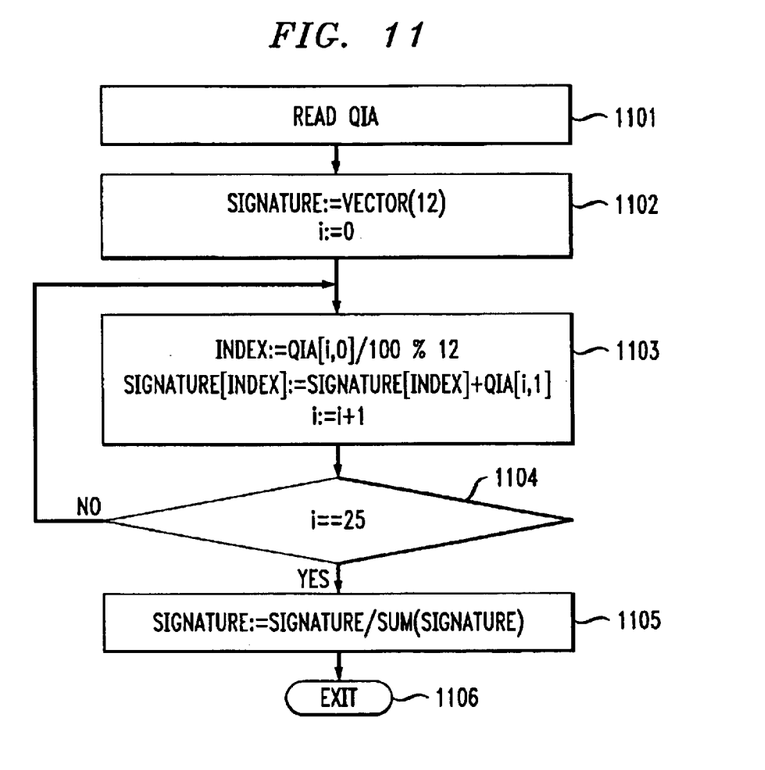
FIG. 11 is a flow diagram describing the peak folding according to an embodiment of the present invention.

The procedure of peak folding, according to an embodiment of the present invention, is shown in FIG. 11. In a first step 1101, the quantized interval array 1000 is retrieved. In the following step 1102, a signature vector comprising twelve elements (if using a well-tempered scale) is created and a counter i, corresponding to the rows of the quantized interval array 1000, is initialized. In the next step 1103, the representative element ('index') for an octave equivalence relation is calculated by $$\text{index}=QIA[i,0]/100 \bmod 12$$

and the power value (QIA[i,1]) is added to the signature value of the representative element $$\text{sig}[\text{index}]=\text{sig}[\text{index}]+QIA[i,1]$$

and the counter i is incremented by the value of '1'. This process is repeated until the complete signature has been computed (i=n), see step 1104. The process continues with step 1105, wherein the normalization of the signature takes place. Therein the signature is normalized to a sum of '1'.

$$\text{sig}=\text{sig}/\text{sum}(\text{sig})$$

Subsequently, the process exits with step 1106, at which time a normalized signature vector is generated. This signature vector is the audio signature 106. In a preferred embodiment, the signature generator 1401, as illustrated in FIG. 14, further comprises an output module 1408, through which the generated audio signature 106 is output.

Figure 12:
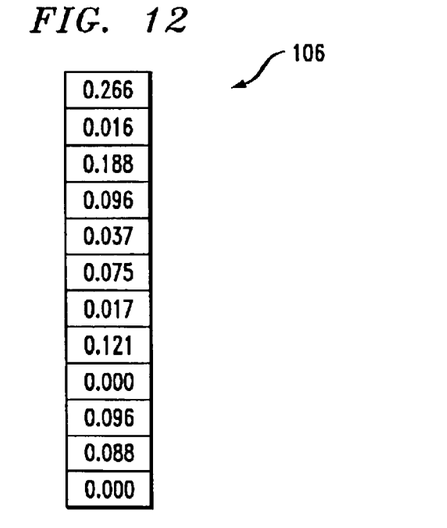
FIG. 12 shows a signature vector according to an embodiment of the present invention.

FIG. 12 shows the resulting audio signature vector 106 comprising n=12 elements according to an embodiment of the invention.

With the procedure illustrated in FIG. 1, a characteristic audio signature 106 of audio signal 100 is generated. In order to determine whether two input audio signals are identical, the audio signature 106 for each audio signal 100 are computed as described above and compared with each other.

Two audio signatures 106 can be compared using any method appropriate for the comparison of vectors. A decision rule with a separation value D depending on the chosen method is used to distinguish identical from non-identical audio data.

In a preferred embodiment of the invention, the method used to compare two signatures is a variant of the Kolomogorov-Smirnov statistic and computes the maximal distance between the two cumulated signatures (Cum1, Cum2). Signatures where the maximal distance is larger than the separation value D are judged to be different. This separation value D has to be determined empirically and may be set manually or automatically as parameter of a signature analyzer.

In a preferred embodiment of the present invention, the analysis of audio signatures 106, performed in order to determine whether sets of audio data (e.g., two audio files) are identical, is carried out in a signature analyzer 1410, as illustrated in FIG. 14. In a preferred embodiment, the signature analyzer 1410 comprises an input module 1411, through which audio signatures 106 are fed into or retrieved by the signature analyzer 1410. Signature Analyzer 1401 also comprises a computing and evaluating module 1412, wherein the distance computing and evaluating (steps 1301–1309 in FIG. 13) are carried out.

Figure 13:
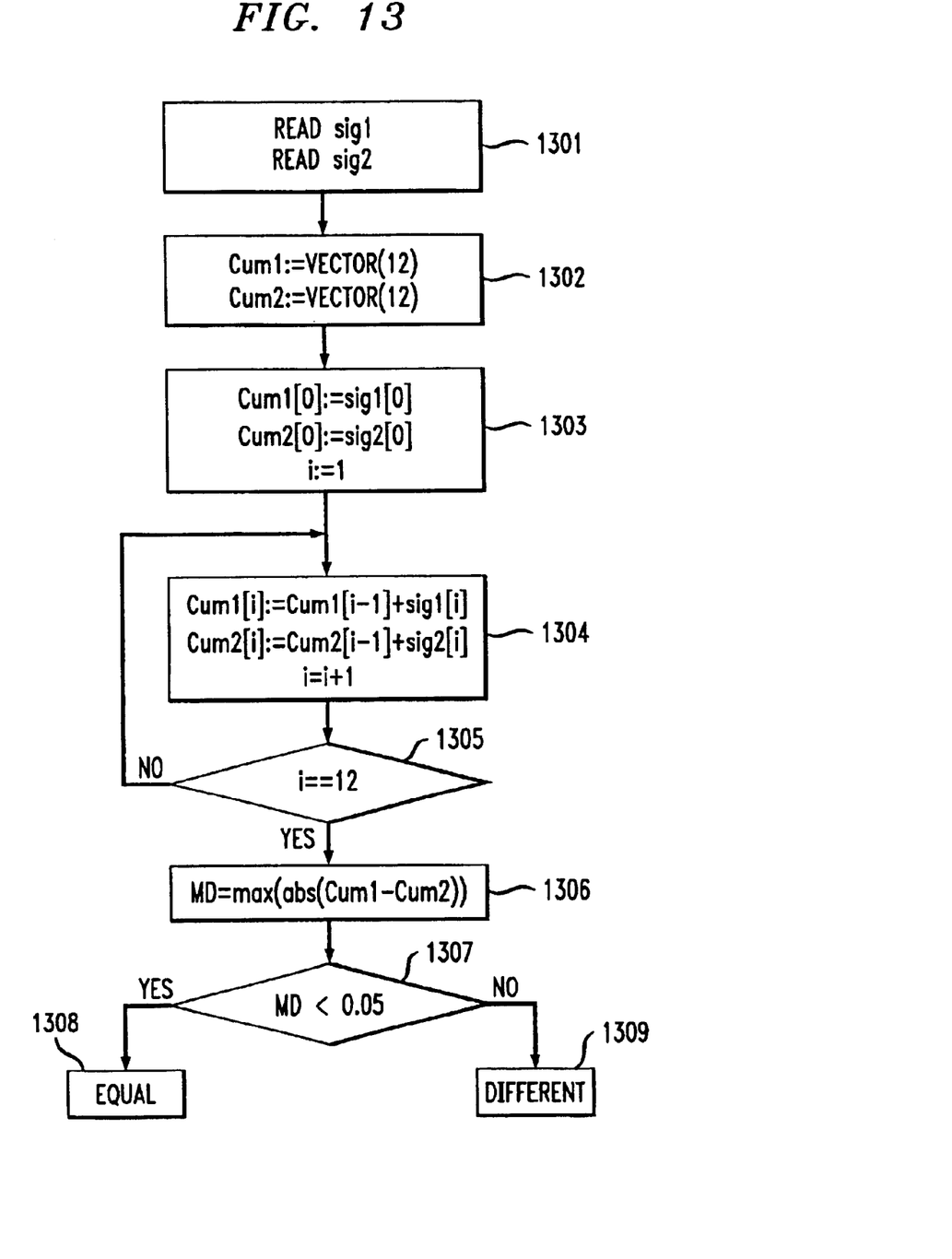
FIG. 13 is a flow diagram describing the computation of a distance between two audio signatures according to an embodiment of the present invention.

The procedure of calculating the distance between the two signatures, according to an embodiment of the present invention, is shown in FIG. 13. In a first step 1301, the two audio signatures 106 to be compared are retrieved. In the following, these signatures are denominated sig1 and sig2.

In step 1302, the vectors (cum1, cum2) of the cumulated signatures are created. Thereby, the length of the cumulated signatures (cum1, cum2) equals the length of the signatures (sig. 1, sig. 2).

In the following step 1303, the first element of each of the cumulated signature vectors (cum1, cum2) is set to the first element of the according signature (sig1[0], sig2[0]), and a counter i representing the number of elements of the vectors (cum1, cum2) is set to the value '1'. In step 1304, the cumulation signature vectors (cum1, cum2) are calculated by $$\text{cum1}[i]=\text{cum1}[i-1]+\text{sig1}[i]$$

$$\text{cum2}[i]=\text{cum2}[i-1]+\text{sig2}[i]$$

and the counter i is incremented by the value of '1'. This process is repeated until all elements of the cumulated vectors (i=12) have been completely processed, see step 1305.

Next the process continues with step 1306 wherein the maximal distance (MD) between the cumulated vectors (cum1, cum2) is computed.

$$MD=\max(abs(\text{cum1}-\text{cum2}))$$

The process continues with step 1307, wherein the maximal distance MD is used to compare the two audio signals 100. In a preferred embodiment, the maximal distance MD is compared with the separation value D, such as 0.05, in order to determine whether the two audio signals 100 are equal (the analyzing process ends with step 1308) or different (the process ends with step 1309). Depending on whether the two audio signals 100 are equal or not, further procedures may be employed subsequent to step 1308 and/or step 1309 respectively (not shown in FIG. 13). For instance, a report showing the result of the signature analysis may be generated and output to an external device such as a monitor or printer, stored in a report file, and/or transferred to a database. In a preferred embodiment, the signature analyzer 1410 as illustrated in FIG. 14 further comprises an output module 1413, through which the result 1414 of the signature analysis is output.

It will be understood and appreciated by those skilled in the art that the inventive concepts set forth in the embodiments described in this application and pertaining to the provision of detecting equal audio data, like audio recordings, may be embodied in a variety of system contexts.

For example, the above described procedure according to the present invention may be used in a system to compare a series of audio files against a set of reference audio in order to find recordings in the set of audio under proof that are part of the set of reference audio. An example of such an application is a system that automatically scans a computer network, e.g. the Internet, for audio files, and compares them against a set of audio of a specific recording company, for instance, and find identical audio data according to the method of the present invention. This would help to find copyright infringements.

Figure 15:
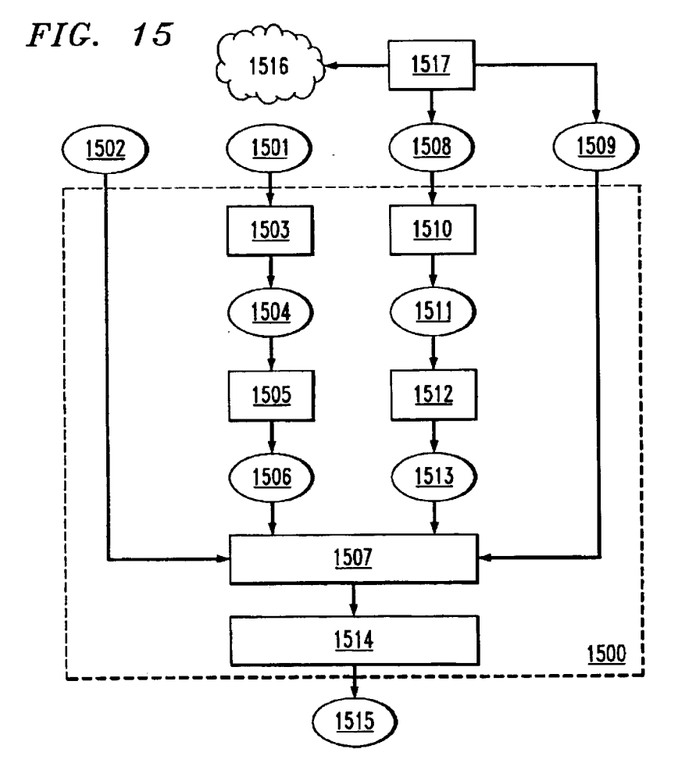
FIG. 15 shows a system for comparing audio files against a set of reference audio files according to an embodiment of the present invention.

The structure of such a system 1500 according to an embodiment of the present invention is shown in FIG. 15. In FIG. 15, the input of the reference information comprises the reference audio file 1501 and descriptive information, the reference metadata 1502. Sources of this information can be sources like physical recordings (e.g., compact disks or master tapes) or computer systems that store the information. The metadata 1502 is an identifier of the audio file such as a catalogue number. Optionally, the metadata 1502 includes other identifying information like title or artist.

A format converter 1503 transforms the original reference audio file 1501 into a formatted reference audio file 1504, which is in a format that is supported by the signature generator 1505 and appropriate for the signature comparison later in the process. If the input format already fulfills these requirements, the conversion can be omitted or reduced to an identity transformation.

The signature generator 1505 (preferably an implementation of the signature generator 1401 as described above, carrying out the steps 101 to 105 of this invention) uses the reference audio file 1504 as input file and generates an audio signature 1506 as specified in the above description.

This signature 1506 of reference audio is stored in a database (signature database) 1507 together with the reference metadata 1502.

The input of the information under proof comprises the audio file 1508 under proof and descriptive information (the metadata 1509 of the audio file under proof). Sources of this information can be physical recordings like CDs, files on computer systems or files that result from a (preferably automatic) scanning of storage systems like computer networks 1516 (e.g. the Internet) by an according scanning device 1517. The metadata 1509 is a characteristic identifier of the audio file, typically the source address (location) of the audio file (e.g., an Internet URL). Additional information might be included if available.

A format converter 1510 transforms the audio file 1508 under proof into a formatted audio file 1511, which is in a format that is supported by the signature generator 1512 and appropriate for the signature comparison later in the process. Again, if the input format already fulfills these requirements, the conversion can be omitted or reduced to an identity transformation.

The signature generator 1512 works preferably according to the procedure described above and can be physically identical with the signature generator 1505. The signature generator 1512 uses the formatted audio file 1511 under proof as input file and generates an audio signature 1513 as specified in this invention.

This audio signature 1513 of the audio 1508 under proof is preferably stored in the database (signature database) 1507, together with the reference metadata 1502.

In a preferred embodiment, after filling the signature database 1507 with the sets of signatures 1506 of reference audio and signatures 1513 of audio under proof, the report generator 1514 scans the signature database 1507 and generates a report 1515. The report generator 1514 preferably comprises an implementation of the signature analyzer 1410 as described above. The report 1515 preferably comprises a list of all reference audio files 1501 and audio files 1508 under proof that have the same signature. Preferably the metadata 1502, 1509 for each listed audio file 1501, 1508 are included in the report 1515.

A system as described above may take all audio of an audio owning company (e.g., record company) as reference input. Furthermore, it may carry out an Internet scanning process (e.g., by a network scanner) to collect audio files 1508 to be examined and then generate a report 1515 of all files found on the Internet that have an identical signature to a signature made from a reference audio. The report 1515 may than be used to check the Internet files 1508 for copyright infringement. This whole process is preferably carried out automatically.

A similar system can be used to establish a service that takes the audio of several audio owning companies as references, scan the Internet and generates reports for each company to check copyright infringements.

In the above description, the invention has been described with regard to digital audio signals. However, the present invention is by no means restricted to audio signals. Other digital data may be used as well.

The present invention can be realized in hardware, software, or a combination of hardware and software. The signature generator 1401 and/or the signature analyzer 1410, as well as the modules used in the system 1500 for comparing a series of audio files against a set of reference audios, can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is to be understood that the embodiments and variations shown and described herein are merely illustrative of the principles of this invention and that various modifications may be implemented by those skilled in the art without departing from the scope and spirit of the invention.

What is claimed is:

1. A method for generating a characteristic identifier for digital data, comprising the steps of:

mapping frequency coordinates and peak values, of a predetermined number of prominent peaks occurring in an energy spectrum generated from the digital data, into a number of equivalence classes, wherein the prominent peaks are selected by using peak values of a plurality of peaks in the energy spectrum, and wherein the peak values for all equivalent frequency coordinates are summed into one of the equivalence classes; and generating the characteristic identifier comprising results of the mapping.

2. The method of claim 1, wherein the step of mapping comprises the step of applying an equivalence transformation to the frequency coordinates and the peak values.

3. The method of claim 1, further comprising the steps of:

generating the energy spectrum from the digital data;

selecting the predetermined number of prominent peaks from the energy spectrum by using peak values of the plurality of peaks in the energy spectrum to select the predetermined number of peaks having highest peak values; and selecting frequency coordinates belonging to the prominent peaks.

4. The method of claim 3, further comprising the steps of:

transforming the frequency coordinates into an interval scale; and quantizing the frequency coordinates.

5. A method for generating a characteristic identifier for digital data, comprising the steps of:

generating an energy spectrum from the digital data;

selecting a predetermined number of prominent peaks from the energy spectrum, wherein the prominent peaks are selected by using peak values of a plurality of peaks in the energy spectrum;

selecting frequency coordinates belonging to the prominent peaks;

transforming the frequency coordinates into an interval scale;

quantizing the frequency coordinates;

applying an equivalence transformation to the quantized frequency coordinates and peak values of the prominent peaks, wherein a constant number of equivalence classes is used, and wherein the peak values for all equivalent frequency coordinates are summed into one of the equivalence classes; and generating the characteristic identifier comprising results of the equivalence transformation.

6. The method of claim 5, wherein the frequency coordinates are transformed into an interval scale by using a frequency of a strongest partial of the energy spectrum as a zero point.

7. The method of claim 5, whereby the frequency coordinates are transformed into an interval scale by using a well-tempered interval scale.

8. The method of claim 5, whereby the frequency coordinates are quantized by rounding them to the nearest value of the interval scale.

9. The method of claim 5, further comprising the steps of:

determining whether the digital data is represented as a series expansion with respect to a complete set of elementary signals; and if the digital data is not represented as a series expansion, carrying out a series expansion.

10. The method of claim 5, whereby the digital data is represented as a series expansion with respect to a complete set of elementary signals, and the energy spectrum is generated using information from the series expansion.

11. The method of claim 5, further comprising the step of:

storing the characteristic identifier into a database.

12. The method of claim 5, further comprising the steps of:

performing the steps of generating, selecting a predetermined number of prominent peaks, selecting frequency coordinates, transforming, quantizing, and applying for two digital data sets, thereby creating two resulting characteristic identifiers;

determining a distance between the two resulting characteristic identifiers; and determining whether or not the digital data sets are identical.

13. The method of claim 12, further comprising the step of:

generating a report comprising a result of the step of determining whether or not the digital data sets are identical.

14. System for generating a characteristic identifier for digital data, the system comprising:

a signature generator comprising a data input module;

a spectrum module connected to the data input module, the spectrum module generating an energy spectrum from the digital data;

a peak selection module connected to the spectrum module, the peak selection module selecting a predetermined number of prominent peaks from the energy spectrum and selecting frequency coordinates belonging to the prominent peaks, wherein the prominent peaks are selected by using peak values of a plurality of peaks in the energy spectrum;

a peak quantization module connected to the peak selection module, the peak quantization module transforming the frequency coordinates into an interval scale and quantizing the frequency coordinates;

a peak folding module connected to the peak quantization module, the peak folding module applying an equivalence transformation to the quantized frequency coordinates and peak values of the prominent peaks, wherein a constant number of equivalence classes is used, and wherein the peak values for all equivalent frequency coordinates are summed into one of the equivalence classes, the peak folding module generating the characteristic identifier comprising results of the equivalence transformation; and a data output module connected to the peak folding module.

15. The system of claim 14, wherein the digital data comprises a digital audio signal.

16. The system of claim 14, further comprising:

a format check module connected to the data input module, and the format check module determining whether the digital data is represented as a series expansion with respect to a complete set of elementary signals; and a series expansion module connected to the format check module, the series expansion module carrying out a series expansion if the digital data is not represented as a series expansion.

17. The system of claim 14, wherein the digital data is represented as a series expansion with respect to a complete set of elementary signals, and the spectrum module generates the energy spectrum using information from the series expansion.

18. The system of claim 14, further comprising:
   a signature analyzer comprising:
      a data input module; and
      a computing and evaluation module connected to the data input module, the computing and evaluation module determining a distance between identifiers of digital data, and determining whether or not digital data sets are identical; and
      a data output module connected to the computing and evaluation module.

19. The system of claim 18, further comprising a report generator connected to the signature generator, the report generator generating a report that comprises a result of the determination of whether or not digital data sets are identical.

20. The system of claim 18, further comprising a database connected to the signature generator.

21. A computer program product for generating a characteristic identifier for digital data, the computer program product directly loadable into an internal memory of a computer, comprising software code portions comprising:
   a step to generate an energy spectrum from the digital data;
   a step to select a predetermined number of prominent peaks from the energy spectrum, wherein the prominent peaks are selected by using peak values of a plurality of peaks in the energy spectrum;
   a step to select frequency coordinates belonging to the prominent peaks;
   a step to transform the frequency coordinates into an interval scale;
   a step to quantize the frequency coordinates;
   a step to apply an equivalence transformation to the quantized frequency coordinates and peak values of the prominent peaks, wherein a constant number of equivalence classes is used, and wherein the peak values for all equivalent frequency coordinates are summed into one of the equivalence classes; and
   a step to generate the characteristic identifier comprising results of the equivalence transformation.

22. The computer program product of claim 21, wherein the software code portions further comprise:
   a step to perform the steps of generate, select a predetermined number of prominent peaks, select frequency coordinates, transform, quantize, and apply for two digital data sets, thereby creating two resulting characteristic identifiers;
   a step to determine a distance between the two resulting characteristic identifiers; and
   a step to determine whether or not the digital data sets are identical.

23. A computer system for generating a characteristic identifier for digital data, the computer system comprising an internal memory and an execution environment, the execution environment configured to:
   generate an energy spectrum from the digital data;
   select a predetermined number of prominent peaks from the energy spectrum, wherein the prominent peaks are selected by using peak values of a plurality of peaks in the energy spectrum;
   select frequency coordinates belonging to the prominent peaks;
   transform the frequency coordinates into an interval scale;
   quantize the frequency coordinates;
   apply an equivalence transformation to the quantized frequency coordinates and peak values of the prominent peaks, wherein a constant number of equivalence classes is used, and wherein the peak values for all equivalent frequency coordinates are summed into one of the equivalence classes; and
   generate the characteristic identifier comprising results of the equivalence transformation.

24. The computer system of claim 23, wherein the execution environment is further configured to:
   perform the steps of generate, select a predetermined number of prominent peaks, select frequency coordinates, transform, quantize, and apply for two digital data sets, thereby creating two resulting characteristic identifiers;
   determine a distance between the two resulting characteristic identifiers; and
   determine whether or not the digital data sets are identical.

* * * * *